United States Patent
Ginsberg et al.

(10) Patent No.: US 7,509,284 B2
(45) Date of Patent: *Mar. 24, 2009

(54) PROCESSING OF ORDERS IN AN TRADING SYSTEM ONCE WARNING LIMITS ARE EXCEEDED

(75) Inventors: Philip M. Ginsberg, New York, NY (US); Andrew C. Gilbert, Califon, NJ (US); Howard W. Lutnick, New York, NY (US)

(73) Assignee: BGC Partners, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/562,719

(22) Filed: Nov. 22, 2006

(65) Prior Publication Data

US 2007/0100737 A1    May 3, 2007

Related U.S. Application Data

(63) Continuation of application No. 09/853,430, filed on May 10, 2001.

(60) Provisional application No. 60/223,028, filed on Aug. 4, 2000.

(51) Int. Cl.
*G06Q 40/00* (2006.01)

(52) U.S. Cl. .................................................. 705/37

(58) Field of Classification Search .................. None
See application file for complete search history.

(56) References Cited

U.S. PATENT DOCUMENTS

| | | | |
|---|---|---|---|
| 5,136,501 A | 8/1992 | Silverman et al. | |
| 5,375,055 A | 12/1994 | Togher et al. | |
| 5,546,523 A * | 8/1996 | Gatto | 715/811 |
| 5,806,050 A | 9/1998 | Shinn et al. | |
| 5,809,483 A | 9/1998 | Broka et al. | |
| 5,819,238 A | 10/1998 | Fernholz | |
| 5,915,209 A | 6/1999 | Lawrence | |
| 5,924,082 A | 7/1999 | Silverman et al. | |
| 5,924,083 A | 7/1999 | Silverman et al. | |
| 5,970,479 A | 10/1999 | Shepherd | |
| 6,014,627 A * | 1/2000 | Togher et al. | 705/1 |
| 6,029,146 A | 2/2000 | Hawkins et al. | |
| 6,058,379 A | 5/2000 | Odom et al. | |
| 6,061,789 A | 5/2000 | Hauser | |

(Continued)

FOREIGN PATENT DOCUMENTS

EP    0 399 850 A2    11/1990

(Continued)

OTHER PUBLICATIONS

Letter of Albert P. Moras and Exhibits Ia—IVb for "QV Trader" and "Bondpage.com", Apr. 4, 2002, 16 pp.

(Continued)

*Primary Examiner*—Hani Kazimi
*Assistant Examiner*—Olabode Akintola
(74) *Attorney, Agent, or Firm*—Glen R. Farbanish

(57) ABSTRACT

A trading system allows a trader and/or counterparty to control whether the trader and/or counterparty wants to continue to be able to trade with the other when a pending trade between the trader and counterparty exceeds one or more warning limits.

46 Claims, 11 Drawing Sheets

U.S. PATENT DOCUMENTS

| | | | |
|---|---|---|---|
| 6,098,051 | A | 8/2000 | Lupien et al. |
| 6,272,474 | B1 | 8/2001 | Garcia |
| 6,317,727 | B1 | 11/2001 | May |
| 6,418,419 | B1 | 7/2002 | Nieboer et al. |
| 6,421,653 | B1 | 7/2002 | May |
| 6,519,574 | B1 | 2/2003 | Wilton et al. |
| 6,625,583 | B1 | 9/2003 | Silverman et al. |
| 6,993,504 | B1 | 1/2006 | Friesen et al. |
| 7,013,292 | B1 | 3/2006 | Hsu et al. |
| 2002/0019799 | A1 | 2/2002 | Ginsberg et al. |

FOREIGN PATENT DOCUMENTS

| | | |
|---|---|---|
| EP | 0 407 026 A2 | 1/1991 |
| EP | 0 411 748 A2 | 2/1991 |
| EP | 0 512 702 A2 | 11/1992 |
| EP | 1 100 030 | 5/2001 |
| EP | 0 873 549 B1 | 8/2001 |
| WO | WO 01/25996 | 4/2001 |
| WO | WO 01/27836 | 4/2001 |

OTHER PUBLICATIONS

Office Action mailed Jul. 19, 2006, U.S. Appl. No. 09/853,430, entitled "Systems and Method for Anonymous Electronic Trading", 12 pp.

USPTO Office Action for U.S. Appl. No. 11/562,674, filed Feb. 14, 2008 (14 pages).

USPTO Office Action for U.S. Appl. No. 09/853,430, filed Jul. 19, 2006 (8 pp).

USPTO Office Action for U.S. Appl. No. 09/853,430, filed Dec. 18, 2006 (9 pp).

USPTO Office Action for U.S. Appl. No. 09/853,430, filed Jun. 21, 2007 (8 pp).

USPTO Office Action for U.S. Appl. No. 09/853,430, filed Dec. 31, 2007 (11 pp).

MoneyMatch, Functional Specification, Version 1, Aug. 1990, The Sequor Group Inc. Software Services.

Assorted Documents from QV Trading Systems (not dated).

Assorted Documents from Bondpage (copyright 2001).

Pending U.S. Appl. No. 09/853,430, entitled "Systems and Methods for Anonymous Electronic Trading", filed May 10, 2001 in the name of Ginsberg et al.

Pending U.S. Appl. No. 11/562,674, entitled "Processing of Trades That Exceed Warning Limits", filed Nov. 22, 2006 in the name of Ginsberg et al.

PCT Search Report for International Application No. PCT/US01/41525; 5 pages; Oct. 26, 2001.

U.S. PTO Office Action for U.S. Appl. No. 10/047,607; 10 pages; Jul. 9, 2007.

U.S. PTO Office Action for U.S. Appl. No. 10/047,607; 9 pages; Dec. 29, 2006.

U.S. PTO Office Action for U.S. Appl. No. 10/047,607; 9 pages; Feb. 28, 2008.

Seqour Group Inc., Money Match Functional Specification (Aug. 1990).

PCT Search Report for International Application No. PCT/US02/016820; 3 pages; Apr. 25, 2003.

* cited by examiner

PROCESSING OF ORDERS IN AN TRADING SYSTEM ONCE WARNING LIMITS ARE EXCEEDED

CROSS REFERENCE TO RELATED APPLICATION

This application is a continuation of U.S. patent application Ser. No. 09/853,430 (U.S. Patent Application Publication No. 2002/0019799), filed May 10, 2001, which claims the benefit of U.S. Provisional Patent Application No. 60/223,028, filed Aug. 4, 2000, both of which are hereby incorporated by reference herein in there entirety.

BACKGROUND OF THE INVENTION

The present invention relates to systems and methods for anonymous electronic trading. More particularly, the present invention relates to systems and methods for electronic trading that enable traders to remain anonymous with each other while still allowing those traders to monitor counterparty risk.

In recent years, electronic trading systems have gained wide spread acceptance for trading of a wide variety of items, such as goods, services, financial instruments, and commodities. For example, electronic trading systems have been created which facilitate the trading of financial instruments and commodities such as stocks, bonds, currency, futures, oil, gold, pork bellies, etc. As another example, online auctions on the Internet have become popular markets for the exchange of services and both new and used goods.

Many of these electronic trading systems use a bid/offer process in which bids and offers are submitted to the systems by a passive side and then those bids and offers are hit and lifted (or taken) by an aggressive side. For example, a passive trader may submit a "bid" to buy a particular number of 30 Year U.S. Treasury bonds at a given price. In response to such a bid, an aggressive side trader may submit a "hit" in order to indicate a willingness to sell bonds to the first trader at the given price. Alternatively, a passive side trader may submit an "offer" to sell the particular number of the bonds at the given price, and then an aggressive side trader may submit a "lift" (or "take") in response to the offer to indicate a willingness to buy bonds from the passive side trader at the given price. In such trading systems, the bid, the offer, the hit, and the lift (or take) are collectively know as "orders". Thus, when a trader submits a bid, the trader is said to be submitting an order.

Given the laws of supply and demand, if a first trader desires to buy or sell an extraordinarily large size of a particular financial instrument or other item, other traders may modify their prices for that instrument or item to the detriment of the first trader in order to take advantage of that desire. In this way, the other traders may distort the market price of the instrument or item away from what the price would be for that instrument or item trading with the same size over varied buyers or sellers. Accordingly, traders frequently desire to remain anonymous when trading so that other traders cannot determine their identity prior to execution of any given trade.

Although traders in electronic trading systems frequently desire to remain anonymous in this way, many traders still desire to be able to monitor counterparty risk by keeping track of and limiting the total size of trades that they are completing with each other trader. Accordingly, it is an object of the present invention to provide systems and methods for electronic trading that enable traders to remain anonymous with each other while still allowing those traders to monitor counterparty risk.

SUMMARY OF THE INVENTION

In accordance with this and other objects of the invention, systems and methods are provided which enable traders to participate in anonymous trading while monitoring their counterparty risk. Monitoring of counterparty risk by a trader is facilitated by allowing the trader to set counterparty switches that indicate counterparties with which the trader does not want to trade, by allowing the trader to specify warning limits for those traders with which the trader does want to trade, and by allowing the trader to specify how over-warning-limit pending trades are to be processed. Once these selections have been made, display of order submissions entered by a counterparty is controlled in accordance with the counterparty switches entered by the counterparty and each trader to which the order submission would be displayed. For example, if the counterparty or a trader has selected to set the counterparty switch for the other party to "OFF," a bid entered by the counterparty would be correspondingly displayed (e.g., in a special color), or not displayed at all, to the trader. Upon a pending trade being initiated by the trader in response to the order submission by the counterparty, the warning limits for the trader and the counterparty may then be checked to confirm that completion of the corresponding trade would not cause any warning limits to be exceeded. In the event that the trade would exceed one or more warning limits, then, based upon the trader's and the counterparty's specifications of how each party wants to process over-warning-limit pending trades, the trade may be automatically executed in full, automatically executed for only a within-warning-limit portion, automatically rejected, manually executed in full, or manually executed for only the within-warning-limit portion. Upon the occurrence of an over-warning-limit pending trade, each party trader may then be prompted to see if the trader wants to turn "OFF" the counterparty switch for the other trade and thereby control display of subsequent order submission by the other trader.

Although the present invention is described herein as being used by "traders," it should be apparent that the term "trader" is meant to broadly apply to any user of a trading system, whether that user is an agent acting on behalf of a principal, a principal, an individual, a legal entity (such as a corporation), etc., or any machine or mechanism that is capable of placing and/or responding to orders in a trading system.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which.

DETAILED DESCRIPTION OF THE INVENTION

The present invention is now described in connection with FIGS. 1-9. Although the present invention is described below in connection with a bid/offer, hit/take trading system, it should be apparent to one of ordinary skill in the art that the control of the display of information, the monitoring of warning limits, and the prompting of a user regarding the subsequent display of the information in accordance with the present invention may be used with any other suitable trading, information display, and/or data processing system.

Figure 1:
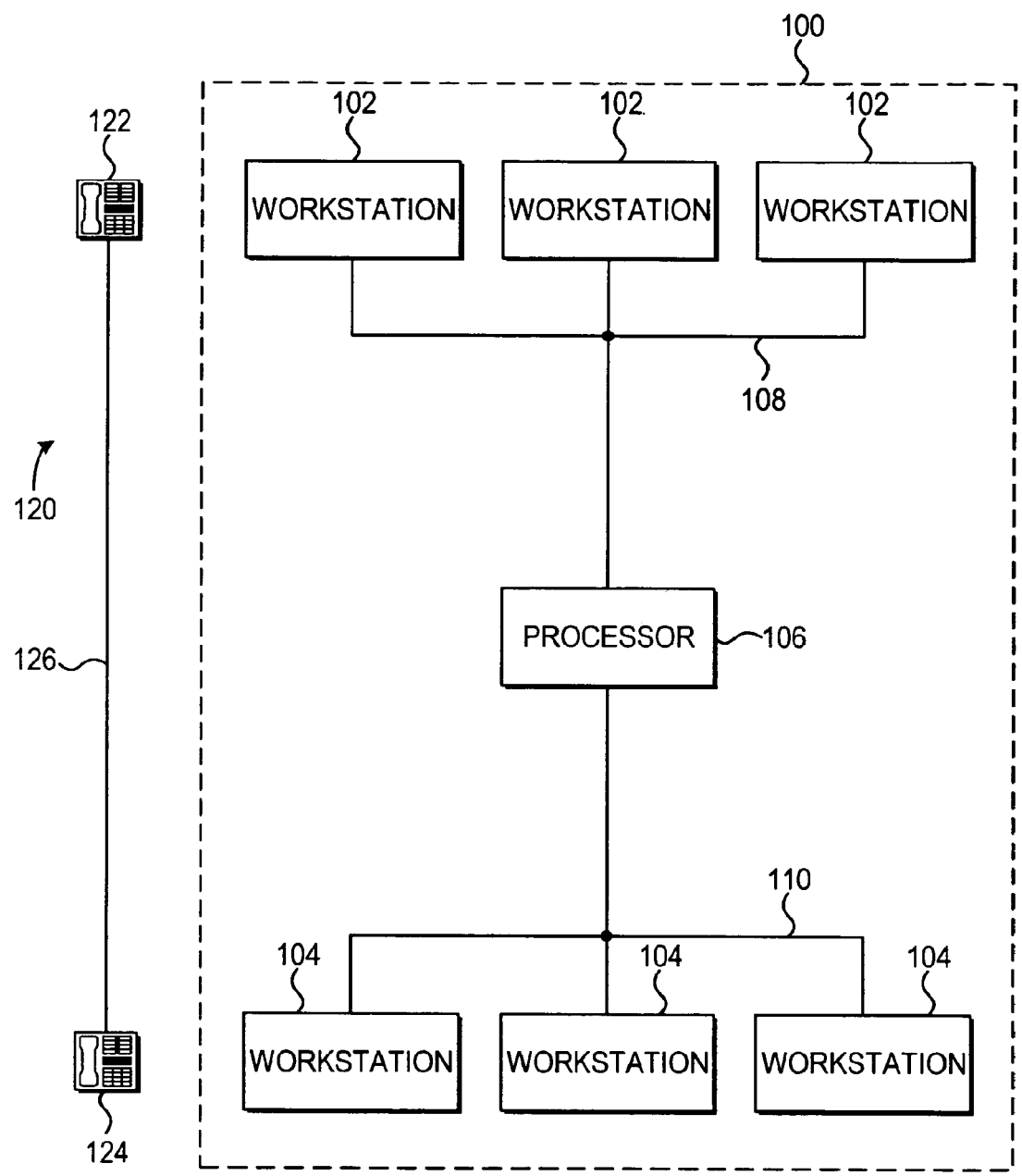
FIG. 1 is a block diagram of one embodiment of hardware that may be used to implement the present invention.

Turning first to FIG. 1, an example of hardware 100 that may be used to implement one embodiment of the present invention is shown. As illustrated, hardware 100 may include one or more local workstations 102 and one or more remote workstations 104 that may be used by traders to view trading data and enter trading commands. Workstations 102 and 104 may be any suitable means for presenting data and, in preferred embodiments of this invention, accepting input. For example, workstations 102 and 104 may be personal computers, laptop computers, mainframe computers, dumb terminals, data displays, Internet browsers, Personal Digital Assistants (PDAs), two-way pagers, wireless terminals, portable telephones, etc., or any combination of the same.

To orchestrate trading between traders using workstations 102 and 104, the workstations preferably submit commands to, and receive data to be displayed from, a processor 106. In alternative embodiments, however, workstations may communicate with additional processors, or include processors to orchestrate trading in a distributed fashion without requiring processor 106. In yet other embodiments, processor 106 may be connected to an external trading system (not shown) that controls trading by the traders. Processor 106, and any additional processors, may be any suitable circuitry or devices capable of processing data such as microprocessors, personal computers, network servers, mainframe computers, dedicated computer systems, etc.

As shown, processor 106 may be connected to workstations 102 and 104 by networks 108 and 110, respectively. Each of networks 108 and 110 may be any suitable data network for communicating data between workstations 102 and 104 and processor 106, such as a local area network, a wide area network, the Internet, an intranet, a wireless network, a hard wired connection, a dial-up network, etc., or any combination of the same. In an arrangement of hardware 100 without processor 106, workstations 102 and 104 may be linked together by networks 108 and 110 directly.

As also shown in FIG. 1, a telephone network 120 may be provided that comprises a local telephone 122 and a remote telephone 124 connected by a telephone line 126. Telephone network 120 may be used to enable a trader at a remote location to communicate with an operator at a workstation 102 or 104. This may be useful when the trader does not have access to a workstation 102 or 104 or when the trader only has access to a display-only workstation 102 or 104. Obviously, telephone network 120 may be implemented as a private telephone network, a public telephone network, a wireless telephone network, or any suitable combination of the same.

When used to implement a bid/offer, hit/take trading system as described above or connect to an external bid/offer, hit/take trading system, hardware 100 may enable a trader to submit a bid to buy, or an offer to sell, an item at one of workstations 102 and 104. This bid or offer may then be communicated to processor 106, where the bid or offer can be ranked and stored in a bid-offer queue. The ranking may be based upon time of submission, price, or any other suitable criterion. The bid or offer may then be presented to other traders via other workstations 102 and 104 dependent upon its ranking in the bid-offer queue. Once displayed, the bid or offer can then be hit or taken by one or more of the other traders so that a trade of the item can proceed to execution.

Figure 2:
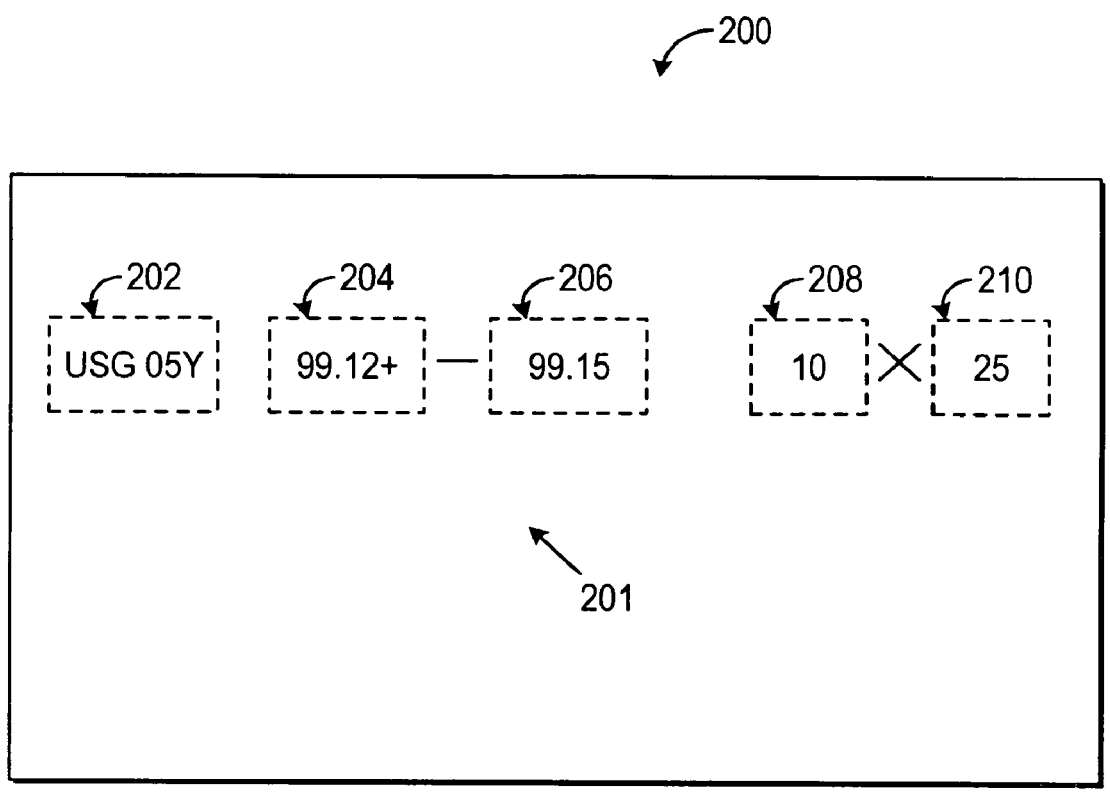
FIG. 2 is an illustration of a screen display that may be presented in accordance with one embodiment of the present invention.

An example of a display 200 for presenting a bid and offer 201 to a trader is shown in FIG. 2. As illustrated, bid and offer 201 may include portions indicating a description of the underlying instrument 202, a bid price 204, an offer price 206, a bid size 208, and an offer size 210. In accordance with the present invention, these portions of bid and offer 201 may be highlighted with one or more colors, or in any other suitable manner, to indicate various traits of the bid and offer. For example, portions 204 and 208 may be colored red to indicate that the counterparty switch of the bidder has been turned off by the trader and, thus, is not tradable by the trader.

Figure 3:
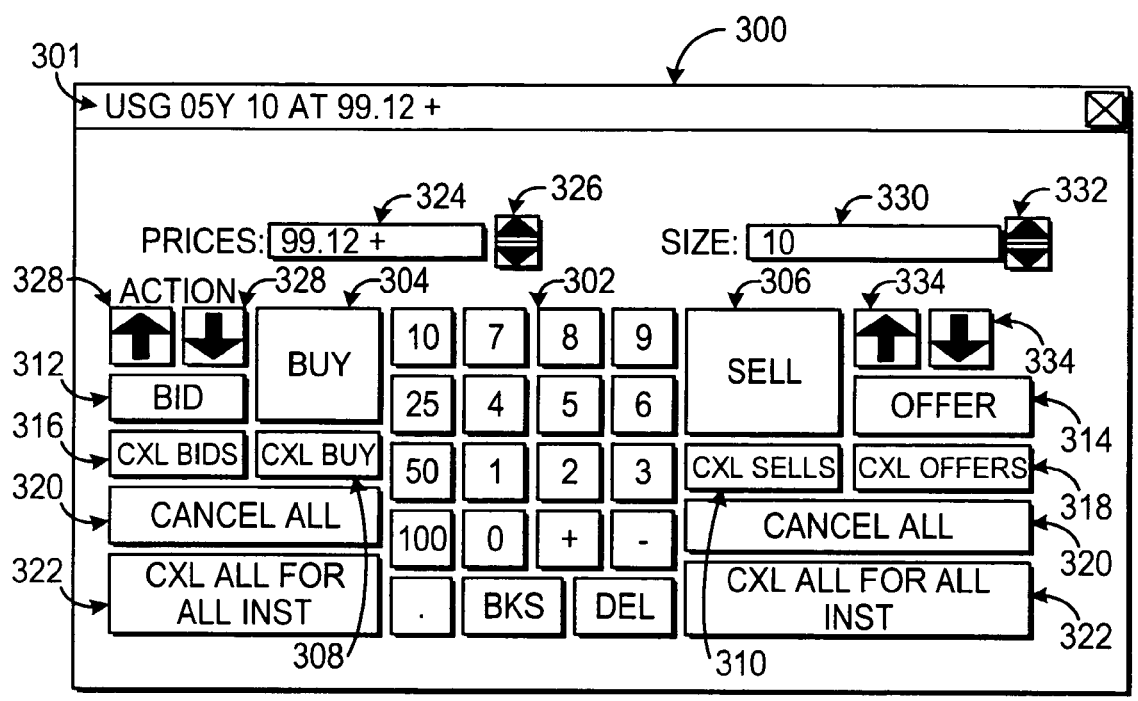
FIG. 3 is an illustration of an interface that may be presented in accordance with one embodiment of the present invention.

Turning to FIG. 3, an interface 300 is shown that may be used to submit and respond to bids and offers presented in display 200 in accordance with the present invention. Interface 300 may be presented on a trader's workstation in response to the trader clicking on any of portions 202, 204, 206, 208, and 210 of bid and offer 201. When presented, interface 300 may then indicate information about the bid and offer clicked-on by the trader in a display 301. As shown, for example, upon the trader clicking on portion 204 of bid and offer 201, interface 300 may be presented with the instrument "usg 05Y" indicated in display 301. Display 301 may also indicate the current bid price for the instrument (i.e., "99.12+") and the current bid size for the instrument (i.e., "10").

As also shown in FIG. 3, a variety of buttons and entry fields may be incorporated into interface 300. At the center of interface 300, a numeric keypad 302 is displayed. As illustrated, numeric keypad 302 provides buttons for numbers zero through nine, ten, twenty-five, fifty, and one hundred. Numeric keypad 302 also contains a plus button ("+"), a minus button ("−"), a decimal point button ("."), a backspace button ("BKS"), and a delete button ("DEL"). Interface 300 also provides a buy button 304, a sell button 306, a cancel buy button 308, a cancel sells button 310, a bid button 312, an offer button 314, a cancel bids button 316, a cancel offers button 318, cancel all buttons 320, cancel all for all instruments buttons 322, a price entry field 324, price up and down buttons 326, bid price up and down buttons 328, offer price up and down buttons 334, a size entry field 330, and size up and down buttons 332.

In order to submit a bid or offer for the instrument indicated in display 301 using interface 300, a trader may first set a bid or offer price and a bid or offer size by entering the appropriate values in fields 324 and 330, respectively, using up and down buttons 326, 328, 332, and/or 334 and/or using keypad 302. Once the desired price and size for the bid or offer have been specified, the trader may then submit the bid or offer by pressing bid button 304 or the offer button 314.

In order to hit a bid or lift (or take) an offer for the instrument indicated in display 301 using interface 300, a trader may first specify a size in field 330 using up and down buttons 332 and/or 334 and/or using keypad 302. Once the desired size has been specified, the trader may then hit the bid or lift (or take) the offer for the specified size by pressing sell button 306 or buy button 304, respectively.

In the event that a trader desires to cancel a bid, an offer, a hit, or a lift (or take), the trader may press any corresponding one of buttons 308, 310, 316, 318, 320, and 322.

Figure 4:
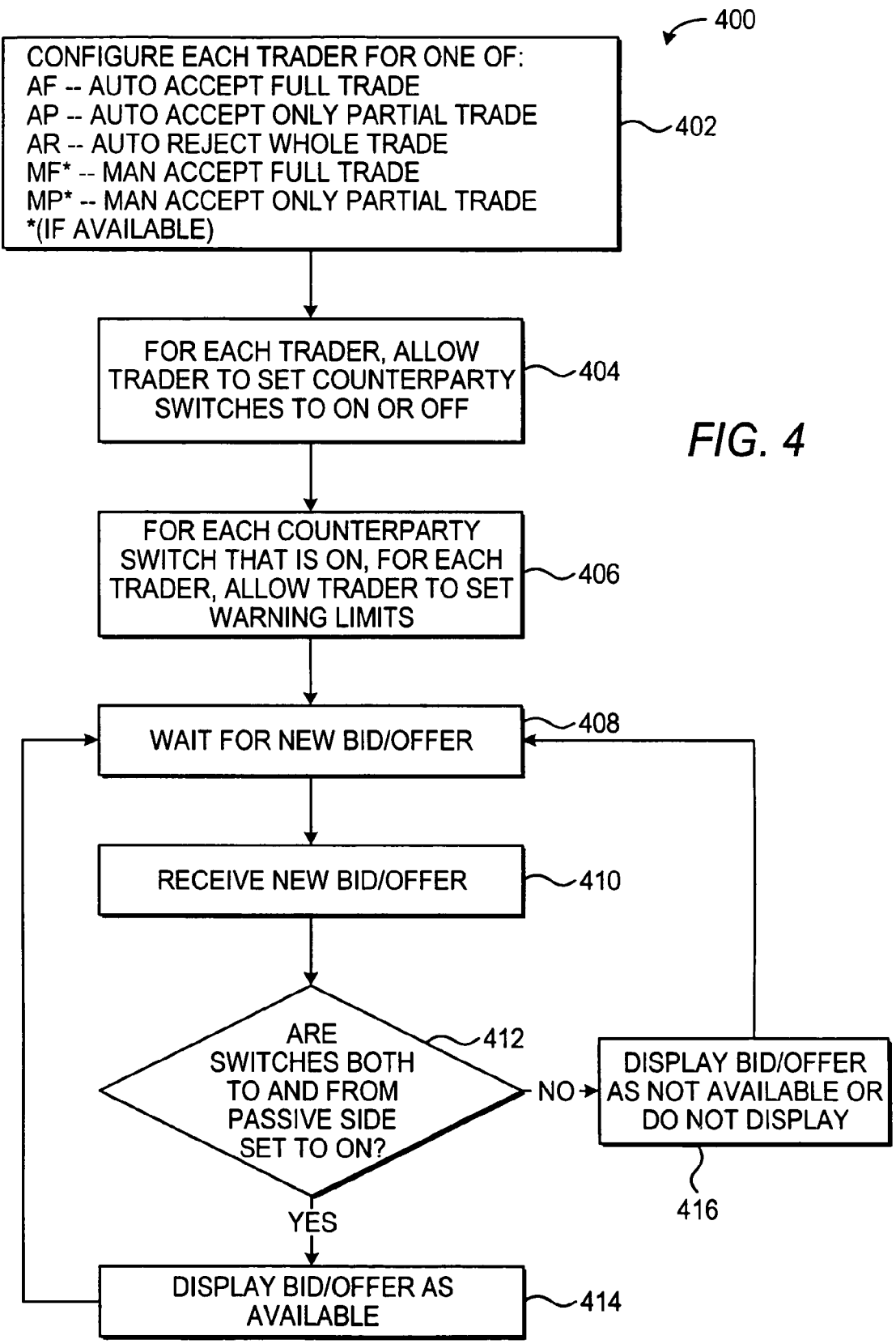
FIG. 4 is a flow diagram of a process for configuring trader workstations and processing bids and offers in accordance with one embodiment of the present invention.

Turning to FIG. 4, a process 400 for configuring a workstation 102 and 104 (FIG. 1) and processing bids and offers that may be executed in processor 106 (FIG. 1) in accordance with one embodiment of the present invention is shown. As illustrated at step 402, process 400 first allows a trader to select how the workstation is to react when a bid or offer is hit or lifted, respectively, and execution of that trade would exceed a warning limit of one of the traders in the trade. The workstation may be configured to automatically accept the full trade, automatically accept only the part of the trade that would not exceed the warning limits of both traders, automatically reject the whole trade, manually accept the full trade after prompting the trader, or manually accept only the part of the trade that would not exceed the warning limits of both traders after prompting the trader. As indicated in FIG. 4, the options of manually accepting the full trade and manually accepting only part of the trade may not be available at workstations 102 or 104 in order to speed trading, simplify trading, or limit decision making by traders with respect to counterparty risk. Alternatively, the manual options may be available and the automatic options may not be available in some embodiments of the invention.

Figure 6:
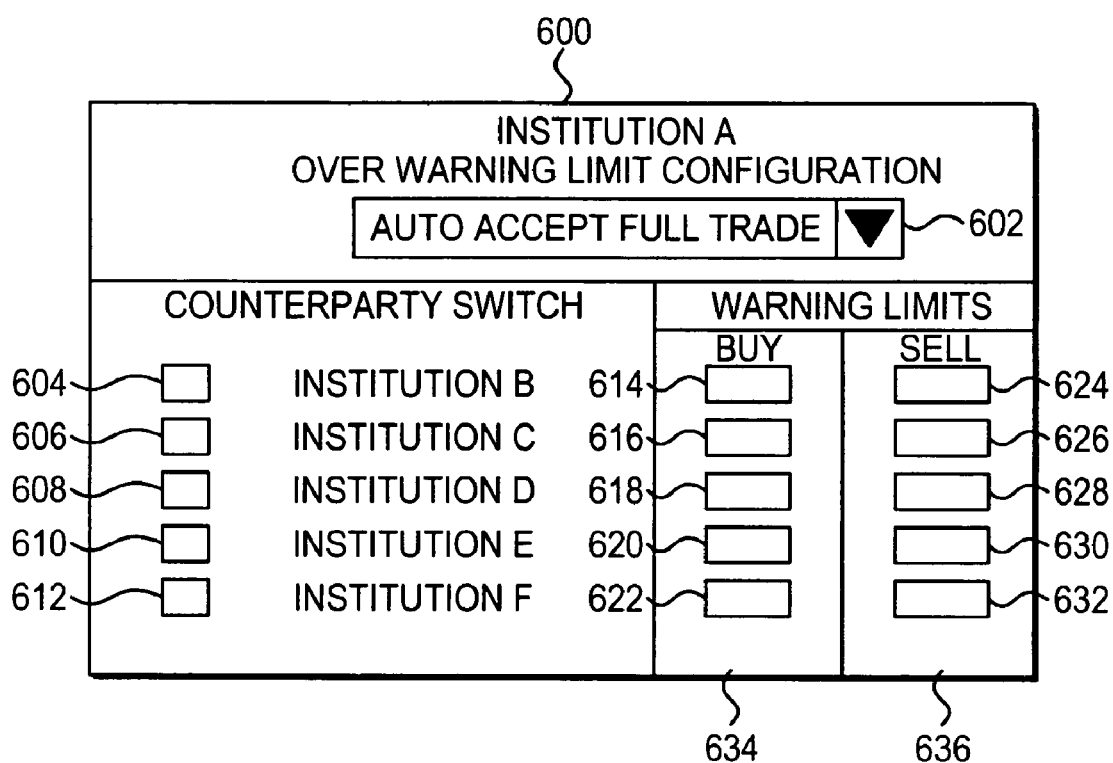
FIG. 6 is an illustration of an interface that may be used to configure trader workstations in accordance with one embodiment of the present invention.

Referring to FIG. 6, an example of an interface 600 that facilitates selection of one of these options is shown. As illustrated, by selecting one of the options from drop-down menu 602, a trader can select how the workstation is to react when execution of a trade would exceed a warning limit of at least one of the traders. Although this selection is shown in interface 600 as being made by selecting one of the options from drop-down menu 602, selection of one of these options may be made in any suitable manner.

Turning back to FIG. 4, process 400 next enables each trader to set counterparty switches for the other traders at step 404. These counterparty switches enable a trader to indicate whether the trader wants to be able to trade with each other trader. A trader may indicate that the trader does not want to trade with another trader, for example, because the other trader backed out of a trade on a previous occasion, because the other trader trades only in small sizes, or for any other suitable reason.

As can be seen in FIG. 6, a trader trading at a workstation 102 or 104 on behalf of Institution A may select whether to trade with counterparty institutions by selecting which of check boxes 604, 606, 608, 610, and 612 to check. Where a check box is checked, the corresponding institution is preferably set to "ON" so that bids and offers from that institution are presented to the trader.

As shown in FIG. 4, once a trader has set the counterparty switches for the other traders, the trader at step 406 may optionally set warning limits for each counterparty having a counterparty switch that is set to "ON." Through interface 600 of FIG. 6, for example, the trader may set warning limits by specifying values in fields 614, 616, 618, 620, 622, 624, 626, 628, 630, and/or 632. These values may be a total dollar amount of buy and sell side transactions, a total dollar amount of buy side only transactions, a total dollar amount of sell side only transactions, a count of the total number of buy and sell side transactions, a count of the total number of buy side only transactions, a count of the total number of sell side only transactions, any other suitable values or combinations of values that are related to order submission of the counterparty and/or any other characteristic of the trader, or any other suitable values or combinations of values that are independent of order submissions of the counterparty and any other characteristic of the trader. Although interface 600 is illustrated with fields 614, 616, 618, 620 and 622 in a buy column 634 and fields 624, 626, 628, 630, and 632 in a sell column 636, the present invention may be implemented with only a single column for total buy and sell transactions or for only one of buy and sell transactions.

Although steps 402, 404 and 406 are illustrated in process 400 of FIG. 4 in a specific order, these steps may be executed in any suitable order or in parallel if desired.

After a trader has specified warning limits at step 406 of FIG. 4, process 400 next waits for new bids and offers to be entered at step 408. As explained above, bids and offers may be entered at workstations 102 or 104 using an interface 300 as illustrated in and described in connection with FIG. 3. Once a new bid or offer has been entered, process 400 next receives the bid or offer at step 410. At step 412, process 400 then determines whether the counterparty switches both to and from the passive side (i.e., the counterparty submitting the bid or offer that was received at step 410) are set to "ON." If both the counterparty switches to and from the passive side are set to "ON," process 400 then displays the bid or offer as available (i.e., a bid or offer that the trader may hit or take (or lift)) at step 414. Otherwise, process 400 displays the bid or offer as not available or does not display the bid or offer at all at step 416. A bid or offer may be displayed as being available or not available by displaying the bid or offer in a corresponding color (e.g., available bids or offers in green and unavailable bids or offers in red), by displaying the bid or offer in a corresponding font (e.g., available bids or offers in bold and unavailable bids or offers in italics), by flashing or not flashing the bid or offer (e.g., available bids or offers flashing and unavailable bids or offers/not flashing), by only displaying a bid or offer if it is available, or in any other suitable manner.

Figure 5A:
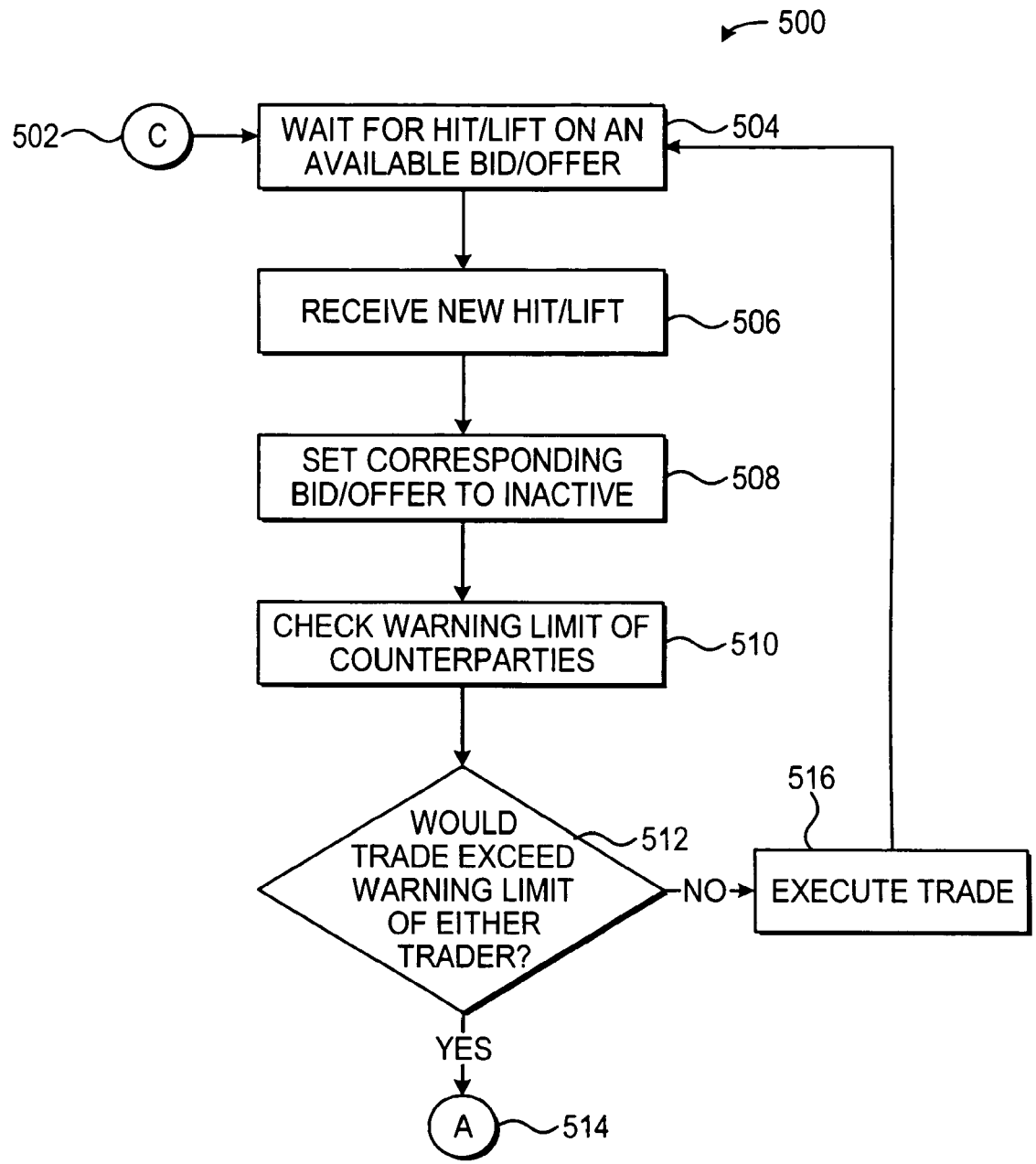
FIGS. 5A-5C are flow diagrams of a process for processing hits and lifts (or takes) and reconfiguring trader workstations in accordance with one embodiment of the present invention.
Figure 5B:
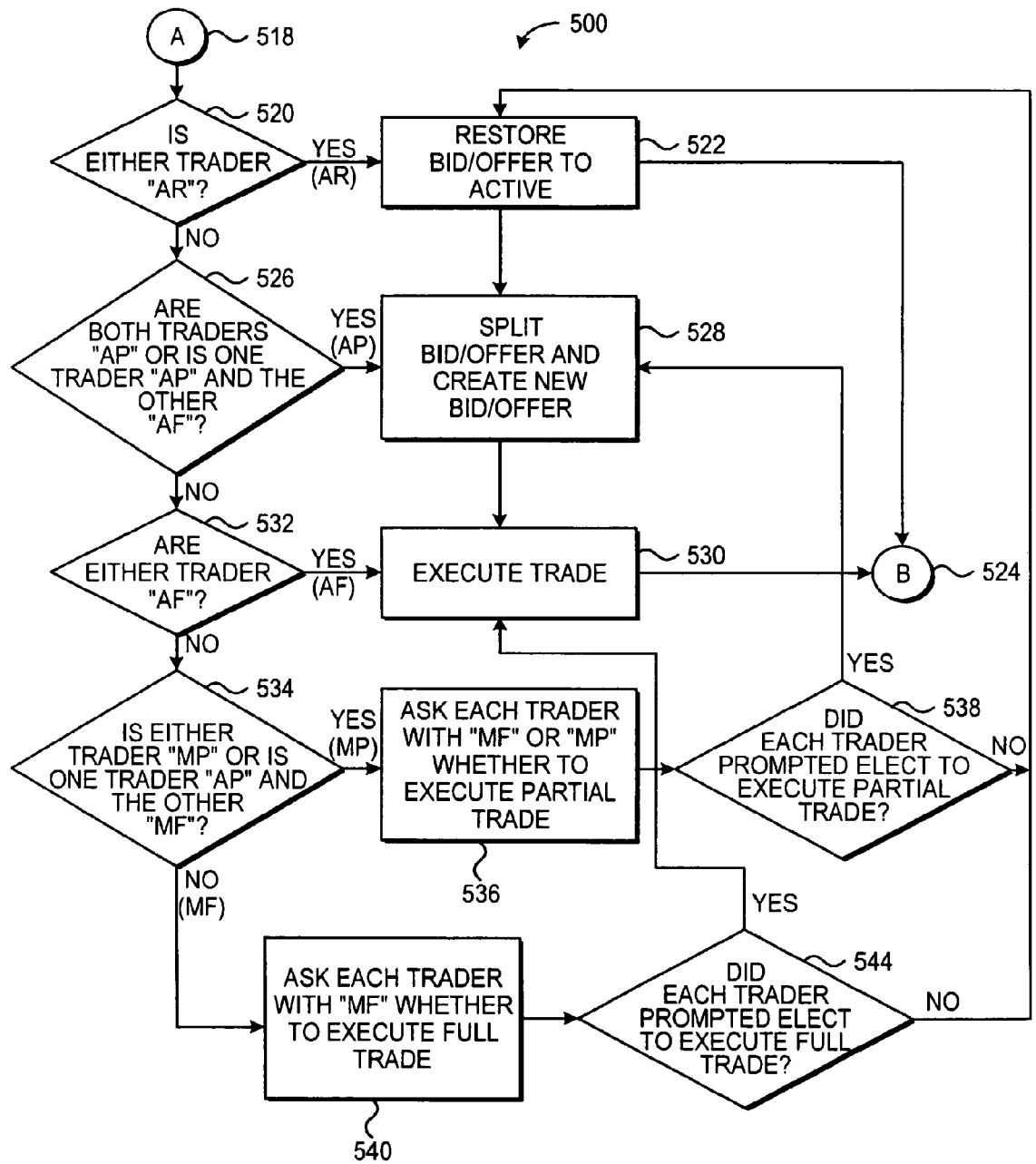
Figure 5C:
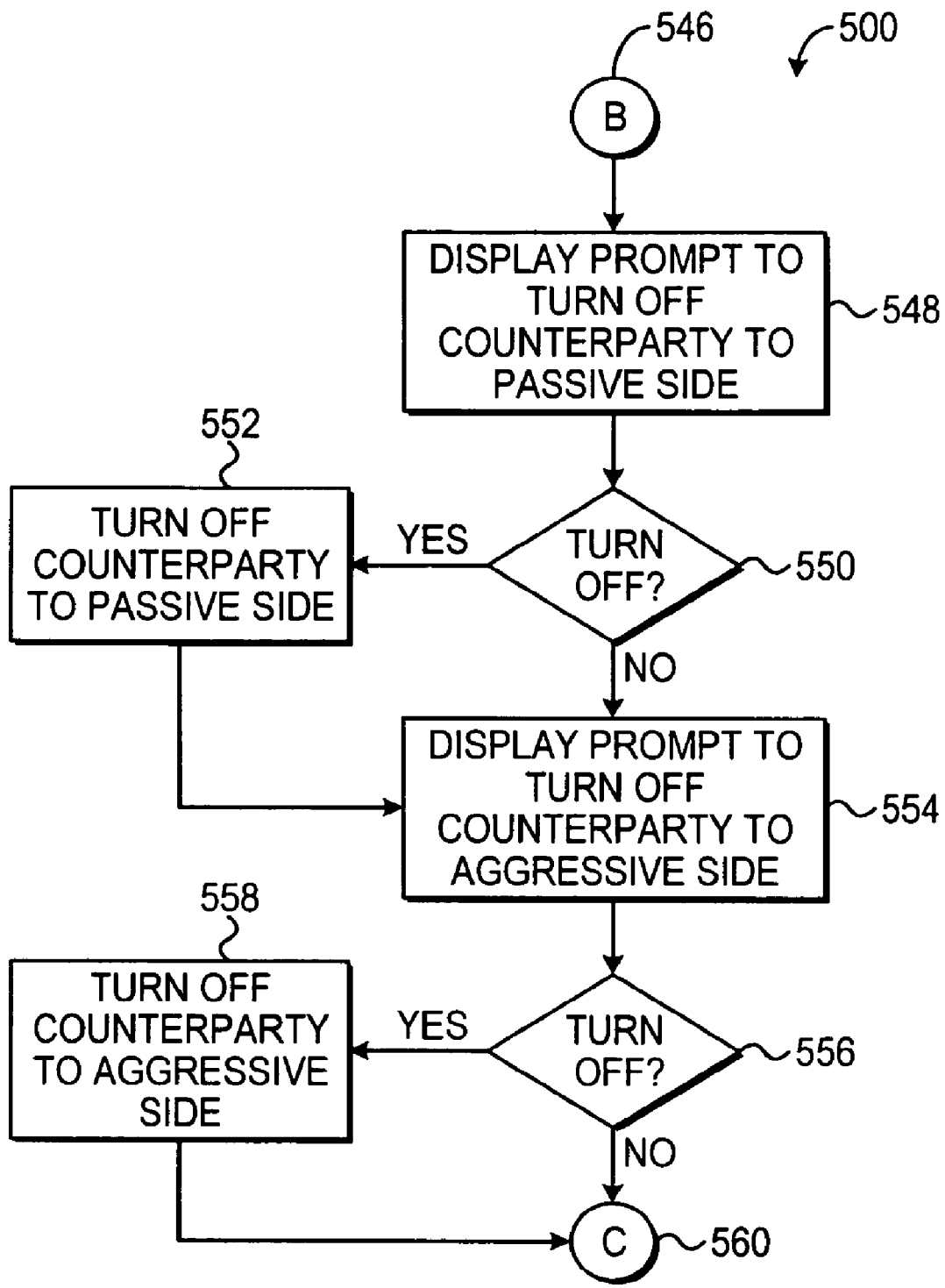

Turning now to FIGS. 5A-5C, a process 500 for processing hits and lifts (or takes) in response to available bids and offers that may be executed in processor 106 (FIG. 1) in accordance with preferred embodiments of the present invention is shown. As explained above, hits and lifts (or takes) may be entered using interface 300 illustrated in and discussed in connection with FIG. 3, for example. Process 500 begins by waiting for a hit or lift (or take) to be entered on an available bid or offer at step 504. Once a hit or lift is received, process 500 receives the new hit or lift at step 506. The bid or offer for which the hit or lift was received is then set to inactive at step 508. The bid or offer is set to inactive in order to prevent the bid or offer from being hit or lifted by another trader while process 400 is determining whether execution of the trade corresponding to the hit or lift of the bid or offer can be executed.

Next, at step 510, process 500 checks the warning limits for each of the traders in the trade. In the case where both a buy side warning limit and a sell side warning limit is specified by a trader, step 510 will first select the appropriate limit for each trader. For example, if a trader A hits a bid by a trader B, and traders A and B both set up both a buy side warning limit and a sell side warning limit, for trader A, the sell side warning limit will be checked and for trader B, the buy side warning limit will be checked. In the event where no sell side warning limit has been set and a trader has hit a bid, or vice versa, the trade may be treated as exceeding the warning limit check or as not exceeding the warning limit check, as desired.

If the trade would not exceed the warning limit of either trader, at step 512, process 500 branches to step 516 to execute the trade and then loop back to step 504. Otherwise, if the trade would exceed the warning limit of either trader, process 500 proceeds to step 520 (FIG. 5B) via links 514 and 518 (FIG. 5B).

At step 520, process 500 then determines if either trader selected automatic rejection of the whole trade in configuring workstations 102 and 104. If either trader did select automatic rejection, then process 500 takes the AR branch and restores the bid or offer to active at step 522 so that the bid or offer may be acted upon by other traders. Once a bid or offer has been restored to active at step 522, process 500 then proceeds to step 548 (FIG. 5C) via links 524 and 546 (FIG. 5C).

If neither trader is configured for automatic rejection, then process 500 determines at step 526 whether both traders selected automatic acceptance of only part of the trade, or whether one trader selected automatic acceptance of only part of the trade and the other trader selected automatic acceptance of the full trade. If not, process 500 proceeds to step 532. If so, process 500 takes the AP branch and at step 528 then splits the bid or offer into a bid or offer for the size that would not exceed either warning limit and a bid or offer for the remaining size. Process 500 then executes the bid or offer for the size that would not exceed the warning limit at step 530, and proceeds to step 548 (FIG. 5C) via links 524 and 546 (FIG. 5C).

At step 532, process 500 inquires whether both traders are configured for automatic acceptance of the full trade. If so, process 500 then takes the AF branch and executes the trade at step 530 and proceeds to step 548 (FIG. 5C) via links 524 and 546 (FIG. 5C). Otherwise, process 500 proceeds to step 534.

Figure 7:
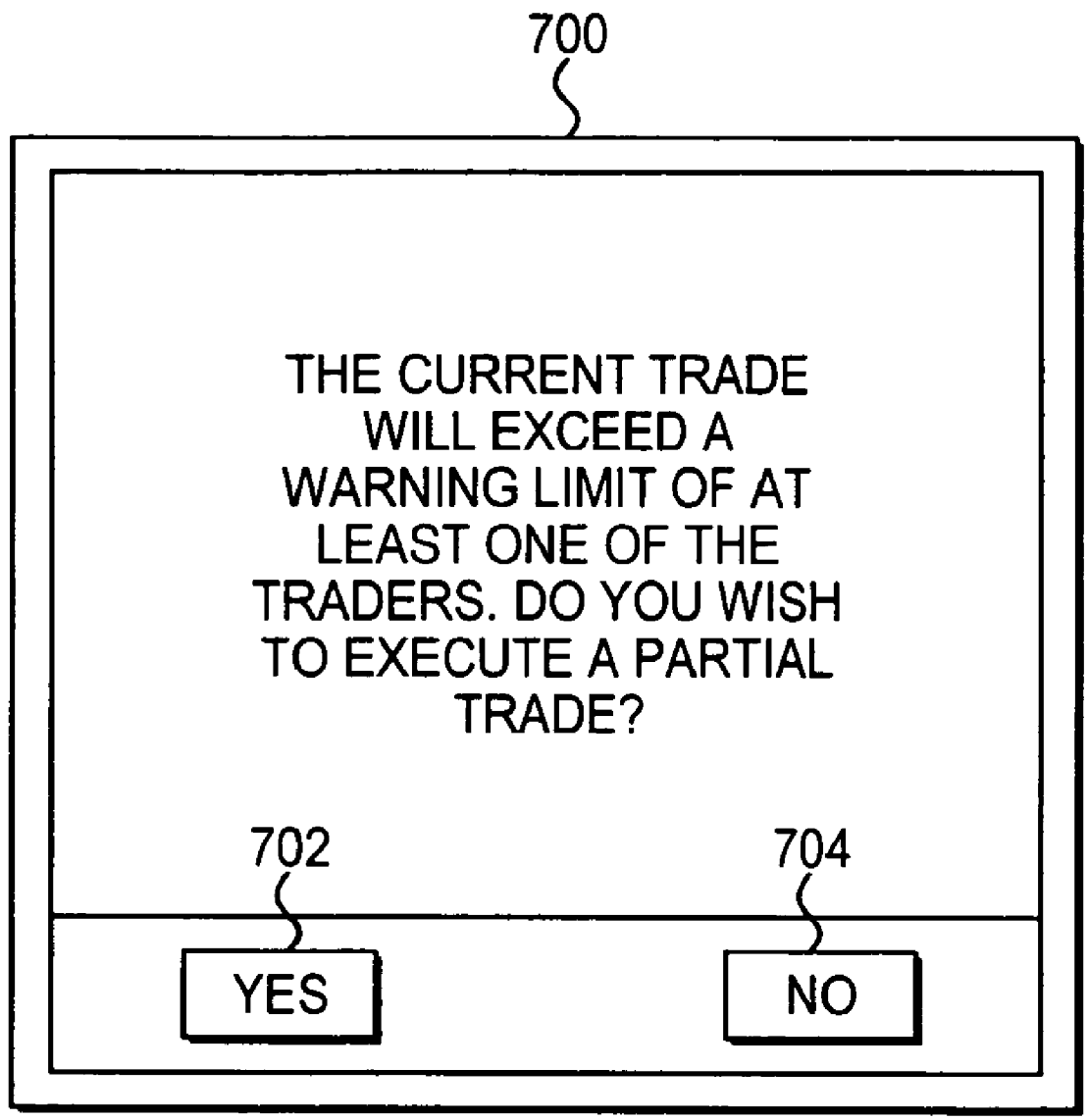
FIG. 7 is an illustration of a prompt that may be used to manually execute a partial trade in accordance with one embodiment of the present invention.

At step 534, process 500 determines whether either trader is configured for manual acceptance of only part of the trade or whether one trader is configured for automatic acceptance of only part of the trade and the other trader is configured for manual acceptance of the full trade. If yes, then process 500 takes the MP branch and proceeds to step 536 whereupon each trader that is configured for manual acceptance of either only part of the trade or the full trade is asked whether that trader would like to execute a partial trade. Such an inquiry may be made by presenting a prompt 700 as shown in FIG. 7. In response to this prompt, the trader may select one of "YES" button 702 or "NO" button 704. In the event that a prompted trader does not respond to prompt 700 within a given period of time, prompt 700 may automatically select one of button 702 and button 704 in order to prevent excessive delays in trading.

Next, at step 538, process 500 determines whether each trader prompted at step 536 elected to execute a partial trade. If so, then process 500 branches to step 528 and performs that step and the subsequent steps in process 500 as described above. Otherwise process 500 branches to step 522 and performs that step and the subsequent steps in process 500 as described above.

Figure 8:
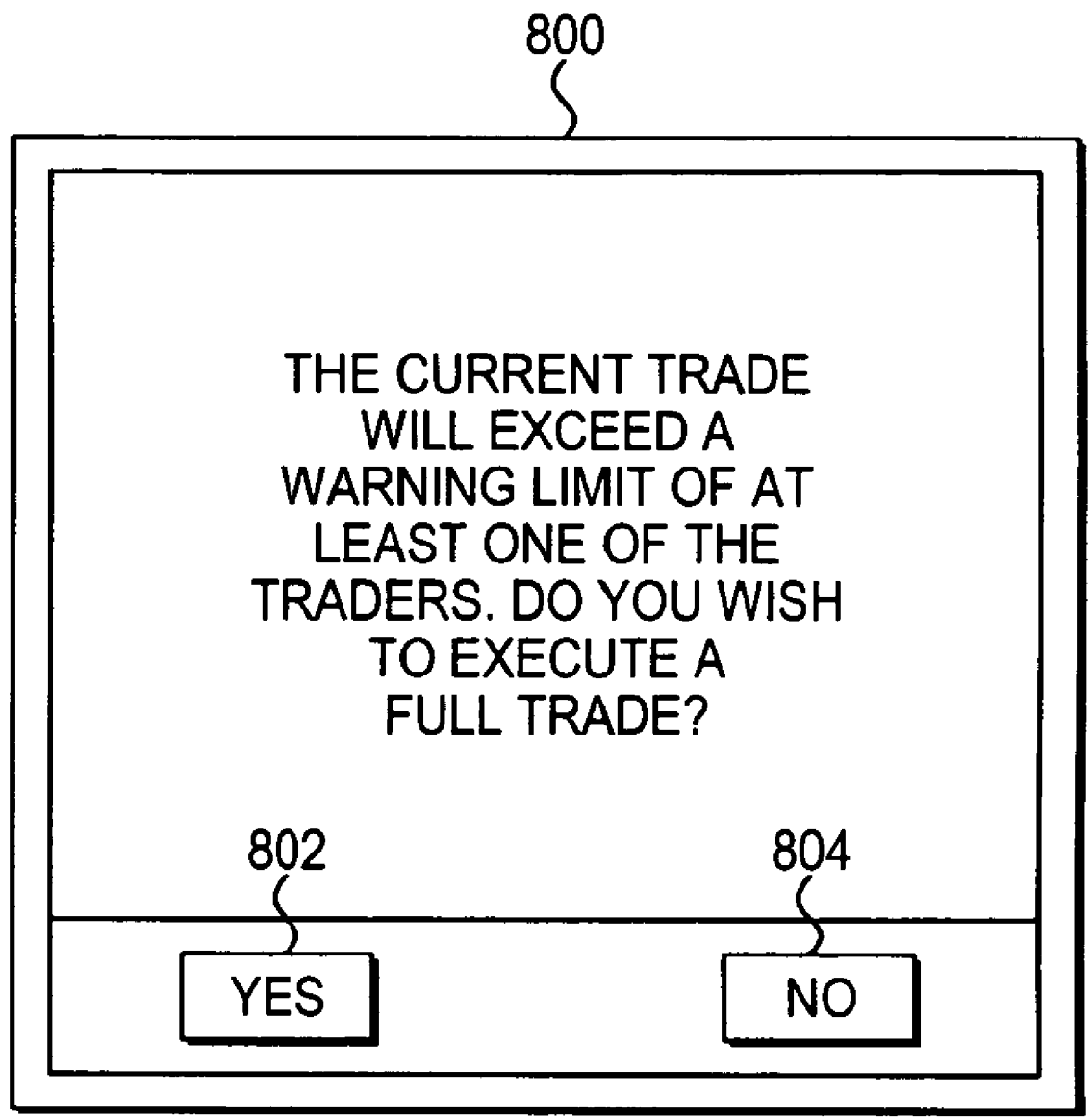
FIG. 8 is an illustration of a prompt that may be used to manually execute a full trade in accordance with one embodiment of the present invention.

If process 500 determines at step 534 that neither trader is configured for manual acceptance of only part of the trade and that one trader is not configured for automatic execution of only part of the trade and/or the other trader is not configured for manual acceptance of the full trade, then process 500 takes the MF branch and proceeds to step 540 whereupon each trader configured for manual acceptance of the full trade is asked whether that trader would like to execute the full trade. Such an inquiry may be made by presenting a prompt 800 as shown in FIG. 8. In response to this prompt, the trader may select one of "YES" button 802 or "NO" button 804. Like prompt 700, in the event that a trader does not respond to prompt 800 within a given period of time, prompt 800 may automatically select one of button 802 and button 804 in order to prevent excessive delays in trading.

Next, at step 544, process 500 then determines whether each trader prompted at step 540 elected to execute the full trade. If so, process branches to step 530 and performs that step and the subsequent steps in process 500 as described above. Otherwise, process 544 branches to step 522 and performs that step and the subsequent steps in process 500 as described above.

Although FIG. 5B illustrates a process 500 that tests for and processes automatic rejection (AR), automatic partial acceptance (AP), automatic full acceptance (AF), manual partial acceptance (MP), and manual full acceptance (MP), the present invention may be implemented without testing for these configuration selections and only perform tests, and subsequent processes, for configuration selections that are available.

Figure 9:
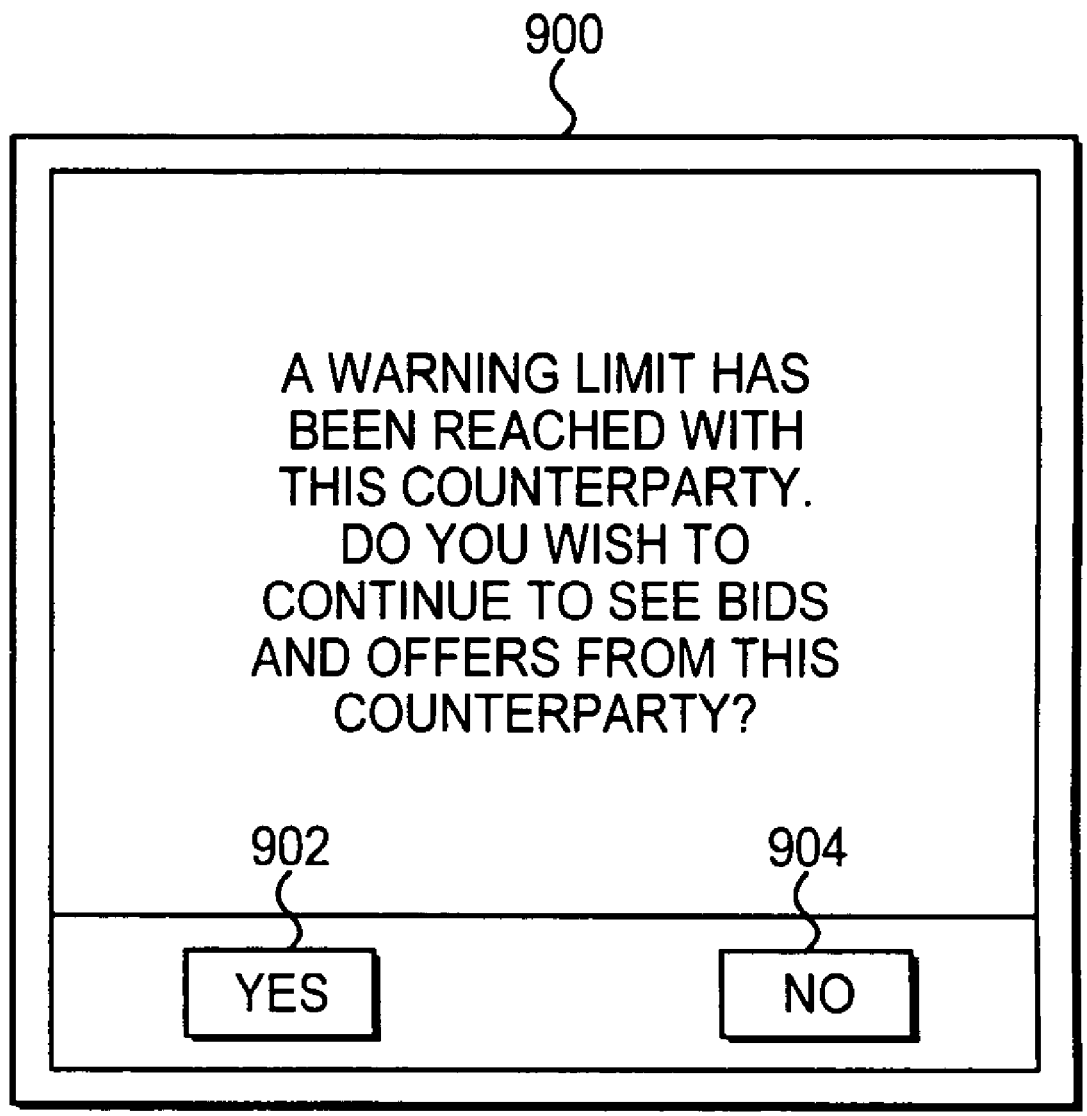
FIG. 9 is an illustration of a prompt that may be used to reconfigure trader workstations in accordance with one embodiment of the present invention.

Upon completing either step 522 or step 530, process 500 proceeds to step 548 (FIG. 5C) via links 524 and 546 (FIG. 5C) and then displays a prompt asking the passive side trader if that trader would like to turn off the counterparty switch for the current counterparty (the aggressor). Such an inquiry may be made by presenting the passive side trader with a prompt 900 as shown in FIG. 9. In response to this prompt the passive side trader may select one of "YES" button 902 and "NO" button 904. If the passive side trader fails to respond to prompt 900 within a given period of time, prompt 900 may automatically select one of button 902 and button 904 in order to prevent excessive delays in trading.

Referring back to FIG. 5C, after performing step 548, process 500 then determines at step 550 whether the passive side trader elected to turn "OFF" the counterparty switch at step 548. If so, then process 500 turns "OFF" the corresponding counterparty switch at step 552. Once the switch has been turned "OFF" at step 552 or if the passive side trader did not elect to turn off the counterparty switch, then process 500 displays a prompt to the aggressive side trader asking whether the aggressive side trader would like to turn "OFF" the counterparty switch corresponding to the passive side trader. This prompt may be presented using prompt 900 of FIG. 9 similarly to the manner described above. If the aggressive side trader elected to turn "OFF" the passive side trader at step 554, process 500, at step 556, branches to step 558 whereupon the corresponding counterparty switch is set to "OFF." Otherwise process 500 loops back to step 504 (FIG. 5A) via links 560 and 502 (FIG. 5A).

Those skilled in the art will appreciate that the present invention can be practiced by other than the described embodiments, which are presented for purposes of illustration and not of limitation, and the present invention is limited only by the claims.

What is claimed is:

1. A method comprising the steps of:
receiving from a first trader a first warning limit specified against a second trader;
receiving from the second trader a second warning limit specified against the first trader;
receiving at a trading system a first order from the first trader;
receiving at the trading system a second order from the second trader, in which the first order and the second order result in a pending trade between the first trader and the second trader;

determining that execution of the pending trade between the first trader and the second trader causes at least one of the first warning limit and the second warning limit to be exceeded; and processing the pending trade between the first trader and the second trader, in which processing the pending trade comprises one of:

the trading system rejecting the pending trade, the trading system executing in part the pending trade such that the executed in part trade does not cause the first warning limit nor the second warning limit to be exceeded, and the trading system executing in full the pending trade; and based at least in part on determining that execution of the pending trade between the first trader and the second trader causes at least one of the first warning limit and the second warning limit to be exceeded, displaying to the first trader via a workstation a prompt as to whether the first trader does or does not want to subsequently trade with the second trader.

2. The method of claim 1, in which a selection by the first trader to not subsequently trade with the second trader results in subsequent orders entered by the second trader being unavailable to the first trader.

3. The method of claim 1, further comprising the step of:
based at least in part on determining that execution of the pending trade between the first trader and the second trader causes at least one of the first warning limit and the second warning limit to be exceeded, displaying to the second trader via another workstation a prompt as to whether the second trader does or does not want to subsequently trade with the first trader.

4. The method of claim 1, further comprising the step of:
in response to the prompt, receiving from the first trader a selection to not subsequently trade with the second trader.

5. The method of claim 3,
in which a selection by the first trader to not subsequently trade with the second trader results in subsequent orders entered by the second trader being unavailable to the first trader; and
in which a selection by the second trader to not subsequently trade with the first trader results in subsequent orders entered by the first trader being unavailable to the second trader.

6. The method of claim 2, in which the subsequent orders entered by the second trader comprise at least one of:
bids, and
offers.

7. The method of claim 4, further comprising the steps of:
receiving a subsequent order from the second trader; and
based at least in part on receiving from the first trader the selection to not subsequently trade with the second trader, making the subsequent order from the second trader, unavailable to the first trader.

8. The method of claim 7, in which the subsequent order comprises at least one of:
a bid, and
an offer.

9. The method of claim 4, further comprising the steps of:
receiving a subsequent order from the first trader; and
based at least in part on receiving from the first trader the selection to not subsequently trade with the second trader, making the subsequent order from the first trader, unavailable to the second trader.

10. The method of claim 1, further comprising the step of:
in response to the prompt, receiving from the first trader a selection to subsequently trade with the second trader.

11. The method of claim 10, further comprising the steps of:
receiving a subsequent order from the first trader; and
based at least in part on receiving from the first trader the indication to subsequently trade with the second trader, displaying to the second trader, via another workstation, the subsequent order from the first trader such that the second trader can hit and/or take the subsequent order from the first trader.

12. The method of claim 10, further comprising:
receiving a subsequent order from the second trader; and
based at least in part on receiving from the first trader the indication to subsequently trade with the second trader, displaying to the first trader via the workstation, the subsequent order such that the first trader can hit and/or take the subsequent order from the second trader.

13. The method of claim 12,
in which the subsequent order from the second trader is displayed using one or more alphanumeric characters;
in which displaying the subsequent order comprises displaying the subsequent order as being available to the first trader such that the first trader can hit and/or take the subsequent order from the second trader; and
in which displaying the subsequent order as being available to the first trader comprises displaying the subsequent order using at least one of:
a particular color for the alphanumeric characters,
a particular font for the alphanumeric characters,
a flashing font for the alphanumeric characters, and
a non-flashing font for the alphanumeric characters.

14. The method of claim 1, in which processing the pending trade comprises executing in full of the pending trade.

15. The method of claim 14, further comprising the step of:
in response to the prompt, receiving from the first trader a selection to subsequently trade with the second trader.

16. The method of claim 14, further comprising the step of:
in response to the prompt, receiving from the first trader a selection to not subsequent trade with the second trader.

17. The method of claim 1, in which processing the pending trade comprises executing in part the pending trade such that the executed in part trade does not cause the first warning limit nor the second warning limit to be exceeded.

18. The method of claim 17, further comprising the step of:
in response to the prompt, receiving from the first trader a selection to subsequently trade with the second trader.

19. The method of claim 1, in which processing the pending trade comprises one of:
executing in full the pending trade,
executing at least in part the pending trade such that the executed in part trade does not cause the first warning limit nor the second warning limit to be exceeded, and
rejecting the pending trade.

20. The method of claim 19, further comprising the steps of:
displaying to the first trader via the workstation and to the second trader via another workstation an interface comprising a plurality of options on how the respective trader wants the trading system to process pending trades that cause warning limits to be exceeded, the plurality of options including:
the trading system automatically rejecting the pending trades, the trading system automatically executing in part the pending trades such that the executed in part trades do not cause the warning limits to be exceeded, the trading system automatically executing in full the pending trades, prompting the respective trader as to whether the respective trader wants the trading system to execute in part the pending trades such that the executed in part trades do not cause the warning limits to be exceeded, and prompting the respective trader as to whether the respective trader wants the trading system to execute in full the pending trades; and receiving from each of the first trader and the second trader a selection of one of the plurality of options; and in which processing the pending trade comprises processing the pending trade based at least in part on the selected option of the first trader and the selected option of the second trader.

21. The method of claim 20, in which the selected option of the first trader and the selected option of the second trader are received prior to receiving the first order from the first trader and the second order from the second trader.

22. The method of claim 1, in which the warning limit of the first trader and the warning limit of the second trader each comprises at least one of:
a total dollar amount of buy side transactions,
a total dollar amount of sell side transactions, and
a total dollar amount of buy side transactions and sell side transactions.

23. The method of claim 1, in which a selection by the first trader to not subsequently trade with the second trader results in subsequent orders entered by the second trader not being displayed to the first trader.

24. The method of claim 1, in which the prompt as to whether the first trader does or does not want to subsequently trade with the second trader comprises a prompt as to whether the first trader does or does not want subsequent orders entered by the second trader being displayed to the first trader.

25. The method of claim 2, in which the subsequent orders entered by the second trader being unavailable to the first trader comprises the subsequent orders being orders that the first trader cannot hit and/or take.

26. The method of claim 3, further comprising the steps of:
in response to the prompt displayed to the first trader, receiving from the first trader a selection to not subsequently trade with the second trader;
in response to the prompt displayed to the second trader, receiving from the second trader a selection to subsequently trade with the first trader;
receiving a subsequent order from the first trader; and
based at least in part on receiving from the first trader the selection to not subsequently trade with the second trader, making the subsequent order from the first trader unavailable to the second trader.

27. The method of claim 26, in which making the subsequent order from the first trader unavailable to the second trader comprises making the subsequent order an order that the second trader cannot hit and/or take.

28. The method of claim 3, further comprising the steps of:
in response to the prompt displayed to the first trader, receiving from the first trader a selection to not subsequently trade with the second trader;
in response to the prompt displayed to the second trader, receiving from the second trader a selection to subsequently trade with the first trader;
receiving a subsequent order from the first trader; and
based at least in part on receiving from the first trader the selection to not subsequently trade with the second trader, causing the subsequent order from the first trader to not be displayed to the second trader.

29. The method of claim 4, further comprising the steps of:
receiving a subsequent order from the second trader; and
based at least in part on receiving from the first trader the selection to not subsequently trade with the second trader, causing the subsequent order from the second trader to not be displayed to the first trader.

30. The method of claim 4, further comprising the steps of:
receiving a subsequent order from the first trader; and
based at least in part on receiving from the first trader the selection to not subsequently trade with the second trader, causing the subsequent order from the first trader to not be displayed to the second trader.

31. The method of claim 4, further comprising the steps of:
receiving a subsequent order from the second trader; and
based at least in part on receiving from the first trader the selection to not subsequently trade with the second trader, displaying to the first trader, via the workstation, the subsequent order from the second trader, in which the subsequent order is unavailable to the first trader.

32. The method of claim 31, in which the subsequent order being unavailable to the first trader comprises the subsequent order from the second trader being an order that the first trader cannot hit and/or take.

33. The method of claim 7, in which making the subsequent order from the second trader unavailable to the first trader comprises making the subsequent order an order that the first trader cannot hit and/or take.

34. The method of claim 9, in which making the subsequent order from the first trader unavailable to the second trader comprises making the subsequent order an order that the second trader cannot hit and/or take.

35. The method of claim 15, further comprising the steps of:
receiving a subsequent order from the second trader; and
based at least in part on receiving from the first trader the selection to subsequently trade with the second trader, displaying to the first trader, via the workstation, the subsequent order such that the first trader can hit and/or take the subsequent order from the second trader.

36. The method of claim 18, further comprising the steps of:
receiving a subsequent order from the second trader; and
based at least in part on receiving from the first trader the selection to subsequently trade with the second trader, displaying to the first trader, via the workstation, the subsequent order such that the first trader can hit and/or take the subsequent order from the second trader.

37. The method of claim 31,
in which the subsequent order from the second trade is displayed to the first trader as being unavailable to the first trader;
in which the subsequent order is displayed using one or more alphanumeric characters; and
in which to display the subsequent order as being unavailable to the first trader comprises displaying the subsequent order using at least one of:
a particular color for the alphanumeric characters,
a particular font for the alphanumeric characters,
a flashing font for the alphanumeric characters, and
a non-flashing font for the alphanumeric characters.

38. An apparatus comprising:
a memory operable to store at least one program; and at least one processor communicatively coupled to the memory;
in which the at least one program, when executed by the at least one processor, causes the at least one processor to:
receive from a first trader a first warning limit specified against a second trader;
receive from the second trader a second warning limit specified against the first trader;
receive a first order from the first trader;
receive a second order from the second trader,
in which the first order and the second order result in a pending trade between the first trader and the second trader;
determine that execution of the pending trade between the first trader and the second trader causes at least one of the first warning limit and the second warning limit to be exceeded;
process the pending trade between the first trader and the second trader, in which to process the pending trade comprises one of;
to reject the pending trade,
to execute in part the pending trade such that the executed in part trade does not cause the first warning limit nor the second warning limit to be exceeded, and
to execute in full the pending trade; and
based at least in part on determining that execution of the pending trade between the first trader and the second trader causes at least one of the first warning limit and the second warning limit to be exceeded, display to the first trader via a workstation a prompt as to whether the first trader does or does not want to subsequently trade with the second trader.

39. The apparatus of claim 38, in which the at least one program, when executed by the at least one processor, further causes the at least one processor to:
in response to the prompt, receive from the first trader a selection to not subsequently trade with the second trader.

40. The apparatus of claim 39, in which the at least one program, when executed by the at least one processor, further causes the at least one processor to: receive a subsequent order from the second trader; and based at least in part on receiving from the first trader the selection to not subsequently trade with the second trader, make the subsequent order from the second trader unavailable to the first trader.

41. The apparatus of claim 40, in which to make the subsequent order from the second trader unavailable to the first trader comprises to make the subsequent order an order that the first trader cannot hit and/or take.

42. The apparatus of claim 39, in which the at least one program, when executed by the at least one processor, further causes the at least one processor to: receive a subsequent order from the second trader; and based at least in part on receiving from the first trader the selection to not subsequently trade with the second trader, cause the subsequent order from the second trader to not be displayed to the first trader.

43. The apparatus of claim 39, in which the at least one program, when executed by the at least one processor, further causes the at least one processor to: receive a subsequent order from the second trader; and based at least in part on receiving from the first trader the selection to not subsequently trade with the second trader, display to the first trader, via the workstation, the subsequent order from the second trader, in which the subsequent order is unavailable to the first trader.

44. The apparatus of claim 43, in which the subsequent order being unavailable to the first trader comprises the subsequent order from the second trader being an order that the first trader cannot hit and/or take.

45. The apparatus of claim 38,
in which to process the pending trade comprises to execute in full of the pending trade;
in which the at least one program, when executed by the at least one processor, further causes the at least one processor to:
in response to the prompt, receive from the first trader a selection to subsequently trade with the second trader;
receive a subsequent order from the second trader; and
based at least in part on receiving from the first trader the selection to subsequently trade with the second trader, display to the first trader, via the workstation, the subsequent order such that the first trader can hit and/or take the subsequent order from the second trader.

46. The apparatus of claim 38,
in which to process the pending trade comprises to execute in part the pending trade such that the executed in part trade does not cause the first warning limit nor the second warning limit to be exceeded;
in which the at least one program, when executed by the at least one processor, further causes the at least one processor to:
in response to the prompt, receive from the first trader a selection to subsequently trade with the second trader;
receive a subsequent order from the second trader; and
based at least in part on receiving from the first trader the selection to subsequently trade with the second trader, display to the first trader, via the workstation, the subsequent order such that the first trader can hit and/or take the subsequent order from the second trader.

* * * * *